UNITED STATES PATENT OFFICE.

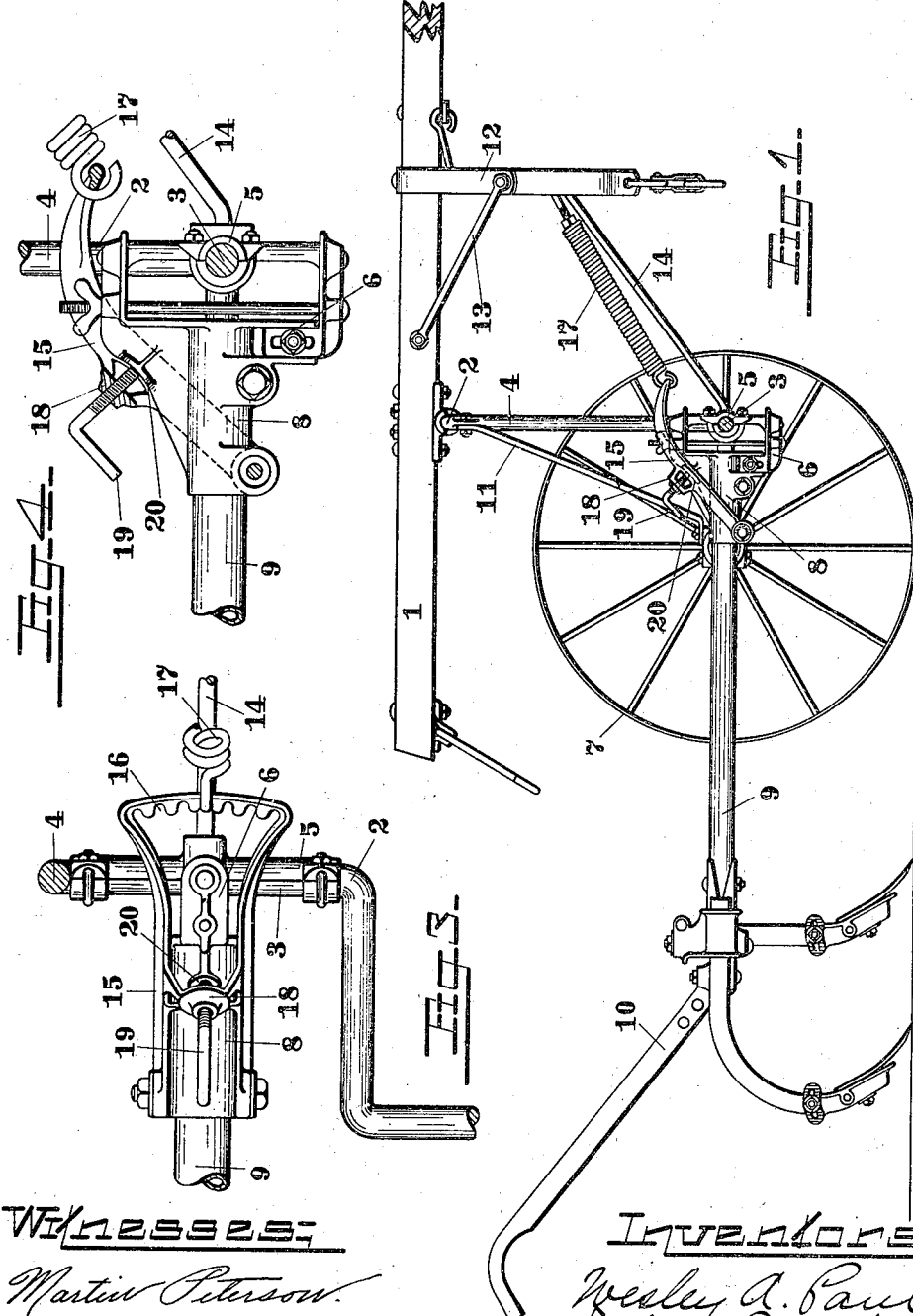

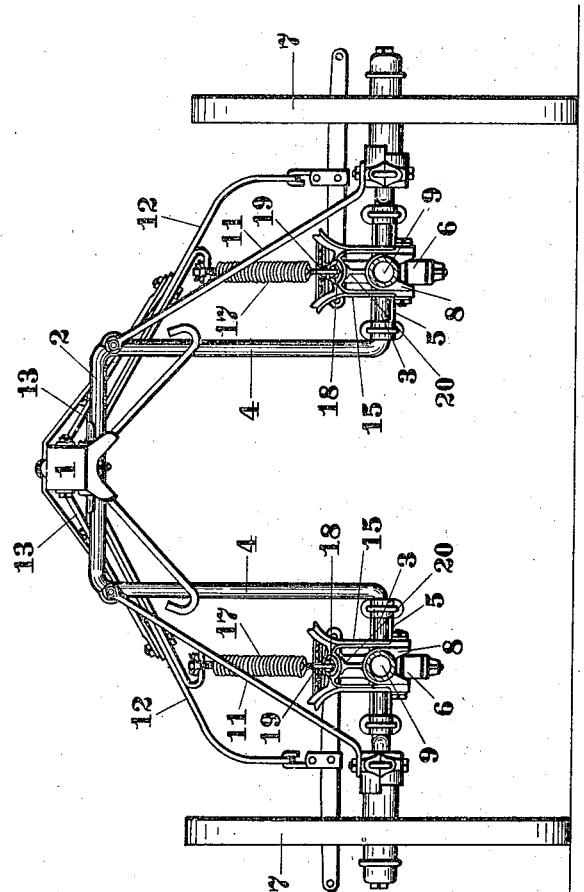

WESLEY A. PAUL AND JOHN P. SEAHOLM, OF MOLINE, ILLINOIS, ASSIGNORS TO DEERE & COMPANY, OF MOLINE, ILLINOIS, A CORPORATION OF ILLINOIS.

CULTIVATOR.

1,243,970.   Specification of Letters Patent.   Patented Oct. 23, 1917.

Application filed January 5, 1914. Serial No. 810,380.

*To all whom it may concern:*

Be it known that we, WESLEY A. PAUL and JOHN P. SEAHOLM, citizens of the United States, residing at Moline, in the county of Rock Island and State of Illinois, have invented certain new and useful Improvements in Cultivators, of which the following is a specification, reference being had therein to the accompanying drawing.

Our invention relates to cultivators and more particularly to means employed for adjustment and regulation of certain parts, the object being an increase in accuracy of operation, as will be more fully described in the following specification.

Referring to the drawings in which similar numerals indicate identical parts—

Figure 1 is a side elevation of a cultivator showing our improvement and with the near wheel removed. Fig. 2 is a rear elevation in part section. Fig. 3 is a detail plan of our improvement, and Fig. 4 is a side elevation of Fig. 2 in part section.

In cultivators of this description adapted to varying depths of cultivation it is desirable to provide means for controlling the depth of penetration of the soil to the end that uniformity of cultivation may be secured under varying conditions; such means we have provided in the following described mechanism.

The supporting frame comprises a pole or tongue 1, a frame arch 2, and a draft arch 12 secured on the pole 1 and rigidly held in position by braces 13. The ends of the arch 2 are bent to form crank axles upon the portions 3 of which, adjacent the vertical arms 4, are sleeves 5 to each of which is secured a coupling 6 adapted to swing vertically and laterally on the sleeves 5 in a well known manner. Supporting wheels 7, of the ordinary type are mounted on the end of each of the crank axles. In a rearwardly extending portion 8 of each coupling is secured a beam 9 carrying cultivating devices, and handles 10. Braces 11 are secured to the arch 2 and to the wheel boxes, and further rigidity is given to the frame structure by draft rods 14 connected to the draft arch 12 and the sleeves 5. Their rearward ends embracing the portions 8 and pivotally secured thereto by a fixed pivot, below the longitudinal center of the beams 9, are bifurcated levers 15 projecting forwardly of the frame arch 2 and preferably curved for a portion of their length and having a series of notches 16 at their forward ends; coiled springs 17 are connected forwardly to the draft arch 12 and rearwardly are adapted to engage with any of the notches 16. Preferably forming part of the bifurcated levers 15 and extending from one arm thereof to the other is a portion 18 having a central threaded perforation through which projects a set screw 19 the lower end of which is adapted to contact and operate against a stop or abutment 20 formed on the coupling 6.

The springs 17 are always at a tension, and when, as shown in Fig. 1, the connections of the springs to the levers 15 and to the frame and the pivotal connection of the levers with the beams are in alinement, the beams and attachments are balanced, the force of the springs acting upon the levers 15 and tending to lift the beams. In pivotally mounting the levers 15 by a fixed pivot some distance rearward of the pivot of the beams on the frame, and preferably at a point below the horizontal center of the beams, we secure a distinct advantage in that, the movement of the beams vertically at this point is so limited that practically the full tension of the springs 17 is exerted at all times, the set screws 19 being operable, while the spring is under tension to move the levers 15 to increase or diminish the tension of the springs 17 so that the balance of the beams can be adjusted to permit of the desired depth of cultivation without disconnecting any of the parts, and it will be seen that when the beams 9 are raised out of an operative position, and the set screws 19 are no longer in contact with the stops 20, the tension of the springs is substantially constant and the beams will rise to the same height each time they are raised regardless of the adjustment of the set screws 19. By connecting the springs 17 to any of the notches 16 on either side of the central notch in the levers 15, the tension of the springs is also utilized to assist in adjusting the beams 9 toward or from the center of the cultivator.

What we claim is—

1. In a cultivator, the combination of a frame, a plow beam connected thereto and adapted to swing vertically, a lever connected to the beam rearward of the connection of the beam with the frame and extending forwardly at an angle to the beam, a controlling spring connected to the forward end of the lever and forwardly to the frame, and means on the lever contacting with the beam and adjustable to vary the angle of the lever to the frame.

2. In a cultivator, the combination of a frame, a plow beam, a coupling connecting the plow beam and frame, a bifurcated lever embracing said coupling and pivotally connected thereto, said lever extending forwardly beyond said coupling and at an angle to the plow beam, a controlling spring connected to the forward end of the lever and forwardly to the frame, the arms of said lever connected intermediate their length, a threaded perforation in said connection, and a screw projected through said perforation and contacting with said coupling and adapted to be turned to vary the angle of the lever with the beam.

In testimony whereof we affix our signatures, in presence of two witnesses.

WESLEY A. PAUL.
JOHN P. SEAHOLM.

Witnesses:
JESSIE L. SIMSER,
BERTHA A. MAURER.

Copies of this patent may be obtained for five cents each, by addressing the "Commissioner of Patents, Washington, D. C."